United States Patent
Pelz et al.

(10) Patent No.: US 7,132,119 B1
(45) Date of Patent: Nov. 7, 2006

(54) METHOD FOR PRODUCING BEER

(75) Inventors: Diter Pelz, Graz (AT); Gilbert Moser, Graz (AT); Gerald Zanker, Hart bei Graz (AT); Walter Serro, Ablass (AT); Volker Ribitsch, Graz (AT); Horst Randhahn, Darmstadt (DE); Peter J. Degen, Huntington, NY (US)

(73) Assignee: Pall Corporation, East Hills, NY (US)

( * ) Notice: Subject to any disclaimer, the term of this patent is extended or adjusted under 35 U.S.C. 154(b) by 0 days.

(21) Appl. No.: 09/402,721

(22) PCT Filed: Apr. 7, 1998

(86) PCT No.: PCT/US98/06969

§ 371 (c)(1),
(2), (4) Date: Dec. 28, 1999

(87) PCT Pub. No.: WO98/45029

PCT Pub. Date: Oct. 15, 1998

(30) Foreign Application Priority Data

Apr. 8, 1997 (AT) ........................................ 596/97
Apr. 8, 1997 (AT) ........................................ 597/97

(51) Int. Cl.
*C12S 9/00* (2006.01)

(52) U.S. Cl. ..................... 426/11; 426/330.4; 426/592; 435/264

(58) Field of Classification Search ............. 426/330.3, 426/330.4, 592, 12, 11; 210/355, 407, 636, 210/321.69, 391, 106; 435/264
See application file for complete search history.

(56) References Cited

U.S. PATENT DOCUMENTS 3,220,928 A    11/1965  Brenner
4,007,113 A    2/1977   Ostreicher
4,740,308 A    4/1988   Fremont et al.
4,912,056 A    3/1990   Olson (Continued)

FOREIGN PATENT DOCUMENTS

DE          39 21 839          1/1991

(Continued)

OTHER PUBLICATIONS

Bolay et al., Streaming Potential in Memnbrane Processes: Microfiltration of Egg Proteins., Journal of Colloid and Interface Science, v. 170 n. 1, Mar. 1, 1995, pp. 154-160.*

(Continued)

*Primary Examiner*—Keith Hendricks
(74) *Attorney, Agent, or Firm*—Leydig, Voit & Mayer, Ltd.

(57) ABSTRACT

The present invention provides a method for producing beer comprising filtering beer through a porous membrane until such time that the porous membrane is in need of cleaning, contacting the porous membrane with an enzyme selected from the group consisting of cellulases, amylases, and combinations thereof, particularly a cellulase having a crystalline:soluble cellulose activity ratio at 60 minutes of at least about 0.1, to clean the porous membrane, and then reusing the porous membrane to continue filtering beer. The present invention further provides a method for producing beer comprising filtering beer through a porous membrane that progressively clogs during filtration, monitoring the streaming or zeta potential of the porous membrane as a measure of the extent of clogging of the porous membrane, halting filtration of the beer through the porous membrane before the porous membrane becomes fully clogged as determined by the streaming or zeta potential of the porous membrane, cleaning the porous membrane, and then reusing the porous membrane to continue filtering beer.

34 Claims, 4 Drawing Sheets

U.S. PATENT DOCUMENTS

| | | | |
|---|---|---|---|
| 5,141,643 A | 8/1992 | Breitbach et al. | |
| 5,277,819 A | 1/1994 | Abrams | |
| 5,356,651 A | 10/1994 | Degen et al. | |
| 5,417,101 A | 5/1995 | Weich | |
| 5,449,465 A | 9/1995 | Degen | |
| 5,594,161 A | 1/1997 | Randhahn et al. | |

FOREIGN PATENT DOCUMENTS

| | | |
|---|---|---|
| DE | 44 01 456 | 7/1995 |
| FR | 2 660 211 | 3/1990 |
| JP | 52-122281 | 10/1977 |
| JP | 01-228509 | 9/1989 |
| JP | 1-304007 | 12/1989 |
| JP | 3-133947 | 7/1991 |
| JP | 4-267933 | 9/1992 |
| JP | 5-317028 | 12/1993 |
| KR | 0107241 | 8/1996 |
| WO | WO 91/00333 | 1/1991 |
| WO | WO 96/23579 | 8/1996 |
| WO | WO 96/37604 | 11/1996 |

OTHER PUBLICATIONS

Berne et al., *Prepared Foods*, 165 (9), 95-96 (1996).
Godfrey et al., *Industrial Enzymology The Application of Enzymes in Industry*, 248-249 (The Nature Press, New York, 1983).
Hug et al., *Schweizer Brauerei-Rundschau*, 85 (8), 153-155 (1974).
Vehviläinen et al., *European Brewery Convention. Proceedings of the of the 17th Congress*, 367-375 (Berlin, 1979).

* cited by examiner

METHOD FOR PRODUCING BEER

TECHNICAL FIELD OF THE INVENTION

The present invention relates to a method of producing beer, particularly of filtering beer through a filtration medium and cleaning the filtration medium with enzymes such that it can be reused in beer filtration.

BACKGROUND OF THE INVENTION

In view of the extended marketing channels, germs (e.g., bacteria) have to be removed from the beer in order to make it storable. Nowadays, germ removal is mainly carried out by pasteurization of the beer. To this end, the beer is, for example, bottled or canned, and heated to a temperature of between 62 and 69° C. to kill the germs.

This pasteurization does, however, involve considerable energy consumption. It has the further disadvantage that the energy introduced can trigger chemical reactions which impair the product and are difficult to control. These reactions can, for example, adversely affect the flavor of the product ("pasteurized taste"), and there is also the danger that undesired substances will form. Pasteurization is, therefore, a relatively expensive germ removing method involving high energy expenditure and, consequently, having harmful effects on the environment as well as reducing the quality of the product.

Another known germ removing method is cold-filtration. Cold-filtered beer is available as so-called "draft beer" in, for example, the United States, Japan and Korea. This beer is prohibited in Europe because it contains technical enzymes.

These technical enzymes are present in the beer to counteract a drawback inherent in the cold-filtration method: early clogging of the filter. This clogging is due to deposits of substances to be filtered out of the beer on the upstream side of the filter, e.g., a membrane filter. The deposits are difficult or even impossible to remove from the filter and reduce the service life of the filter. This increases the cost of producing the beer as membrane filters are expensive.

To prolong the service life of the filter, the manufacturers of membrane filters recommend cleaning the used membranes by treating them with proteases, glucanases, and xylanases, as well as with chemicals such as surfactants, acids/bases, and oxidizing agents, to make them reusable. This cleaning can be carried out at, for example, two stages, with the above-mentioned enzymes at a first stage, followed optionally by additional cleaning with the above-mentioned chemicals in a second stage.

The literature also discloses methods of cleaning membrane filters used in filtering beer, which cleaning methods involve a variety of techniques. For example, U.S. Pat. No. 5,227,819 discloses a method for the cleaning of a polyamide microporous membrane used in cold-filtering beer by passing a dilute alkaline solution through the microporous membrane. International Patent Application WO 96/23579 discloses a somewhat different method of cleaning a membrane filter used in beer filtration. That method is characterized by treating the membrane filter with an enzyme-containing aqueous solution of β-glucanases, xylanases, and cellulases, cleaning the membrane filter with an acidic aqueous cleaning solution, and cleaning the membrane filter with a peroxide-containing alkaline cleaning solution.

Given, for example, a filter area of approximately 320 $m^2$, a cleaning procedure will, by way of example, make provision for enzymatic cleaning after every 5,000 hectoliters filtered and an additional chemical cleaning after every 20,000 hectoliters filtered. The typical service life of filters with the above-mentioned filter area of approximately 320 $m^2$ having undergone the manufacturer-recommended cleaning is approximately 100,000 hectoliters.

The previously known cleaning procedures do, however, have the disadvantage that they are unable to remove the deposits on the filter to a satisfactory extent, which causes the cleaning efficiency to diminish strongly as the membrane filter increases in age.

Yet another disadvantage is the sudden, random clogging of the filter membrane, unrelated to standard norms like total nitrogen content, or percent of original wort. A fully clogged membrane filter cannot be satisfactorily cleaned under procedures following the current state of technology, which greatly reduces the service life of the filter. It is difficult to determine when a filter will become so clogged that it cannot be satisfactorily cleaned, and, therefore, a filter may be cleaned prematurely or not in time, i.e., too early or too late.

In view of the foregoing problems, there exists a need for an improved method of producing beer, particularly wherein the beer can be filtered through a filtration medium that can be satisfactorily cleaned and reused. The present invention provides such a method. These and other advantages of the present invention, as well as additional inventive features, will be apparent from the description of the invention provided herein.

BRIEF SUMMARY OF THE INVENTION

The present invention provides a method for producing beer comprising filtering beer through a porous membrane until such time that the porous membrane is in need of cleaning, contacting the porous membrane with an enzyme selected from the group consisting of cellulases, amylases, and combinations thereof, particularly a cellulase having a crystalline:soluble cellulose activity ratio at 60 minutes of at least about 0.1, to clean the porous membrane, and then reusing the porous membrane to continue filtering beer. The present invention further provides a method for producing beer comprising filtering beer through a porous membrane that progressively clogs during filtration, monitoring the streaming or zeta potential of the porous membrane as a measure of the extent of clogging of the porous membrane, halting filtration of the beer through the porous membrane before the porous membrane becomes fully clogged as determined by the streaming or zeta potential of the porous membrane, cleaning the porous membrane, and then reusing the porous membrane to continue filtering beer.

DESCRIPTION OF THE PREFERRED EMBODIMENTS

Figure 1:
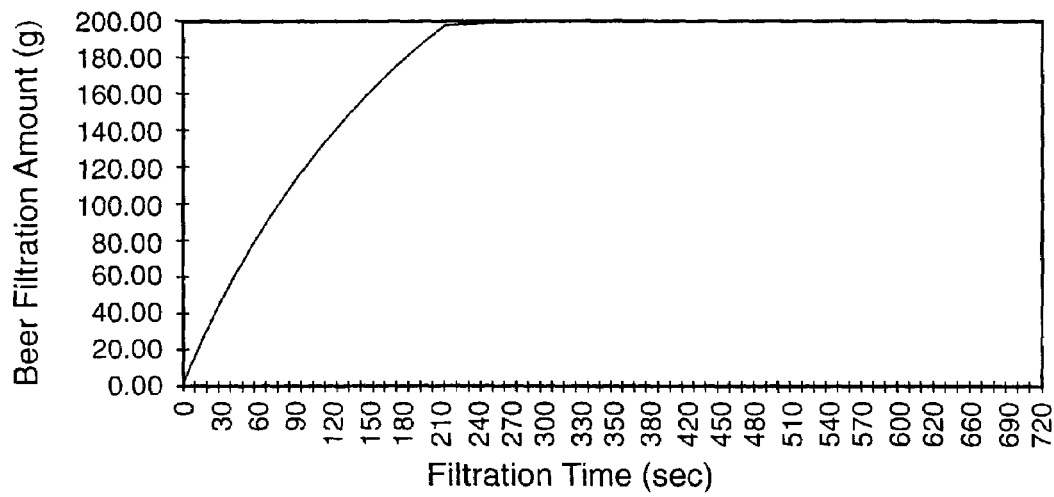
FIG. 1 is a graph of beer filtration amount (g) versus filtration time (sec) in connection with filtering beer through a previously unused, i.e., a new, porous membrane.

The present invention provides a method for producing beer, preferably cold-filtered beer. The method comprises filtering beer through a porous membrane, i.e., a membrane filter, until such time that the porous membrane is in need of cleaning, contacting the porous membrane with an enzyme to clean the porous membrane, and then reusing the porous membrane to continue filtering beer.

It surprisingly has been discovered that porous membranes can be cleaned better and more gently with a cellulase and/or with an amylase than with proteases, xylanases, and/or glucanases. Cleaning in accordance with the present invention results in a considerable increase in the service life of porous membranes used in the filtering of beer and therefore greatly improves the commercial benefit attendant the use of porous membranes in the production of beer.

The enzyme is selected from the group consisting of cellulases, amylases, and combinations thereof. As indicated above, proteases, xylanases, and/or glucanases need not be used, and, preferably, are not used, with the cellulase and/or amylase to clean the porous membrane. The cellulase desirably has a crystalline:soluble cellulose activity ratio (described more fully below) of at least about 0.1, more desirably at least about 0.3, preferably at least about 0.4, more preferably at least about 0.5, and most preferably at least about 1, particularly at least about 1.2. Suitable cellulases include cellulases derived from *Aspergillus*, particularly *Aspergillus niger*. Preferred cellulases include cellulases derived from *Trichoderma*, preferably *Trichoderma reesei* and *Trichoderma longibrachiatum*, and *Thermomonospora*, preferably from *Thermomonospora fusca*. Other sources of cellulases are recited in U.S. Pat. No. 4,912,056. Suitable amylases include α-amylase, β-amylase, and combinations thereof. More preferably, no enzymes other than cellulases and amylases are utilized in the present inventive method, i.e., the porous membrane is not contacted with an enzyme other than a cellulase or an amylase. Most preferably, the enzyme utilized in the present inventive method is a cellulase, and optimally no enzyme other than a cellulase is utilized, i.e., the porous membrane is contacted with a cellulase and is not contacted with any other enzyme.

The porous membrane can be any membrane suitable for the filtration of beer. In the context of the present invention, the porous membrane typically will be a microporous membrane, i.e., a porous membrane with a pore rating of about 0.02–1 μm. The porous membrane preferably will have a pore rating of about 0.1–1 μm, most preferably about 0.45 μm. Such a porous membrane can be used to remove bacteria and other undesirable germs from the beer, preferably obviating the need to pasteurize the beer. The porous membrane also can be used to remove yeast and other undesirable substances from the beer. Suitable porous membranes include those prepared from inorganic materials such as ceramics and metals, as well as, preferably, organic polymers such as polyamides, polyethersulfones, polyolefins, polyvinylidenefluoride, and the like. The porous membrane preferably is a polyamide porous membrane, especially a nylon-6,6 porous membrane.

A preferred embodiment of the method according to the present invention is characterized in that the porous membrane is additionally brought into contact with an aqueous base, with the porous membrane being advantageously brought into contact with the aqueous base at a first stage and with the enzyme at a second stage. The use of an aqueous solution of NaOH and/or KOH as the aqueous base has proven expedient. It is preferable for the base to be present in a concentration of 0.1 to 1 N, more preferably 0.25 to 1 N, and most preferably 0.5 to 1 N. The treatment with the aqueous base is best carried out at a temperature of between 40 and 90° C.

Further advantageous embodiments of the method according to the present invention are characterized in that the treatment with the cellulase is carried out at a temperature of between 40 and 50° C. and a pH of between 4.5 and 5.5, the treatment with the α-amylase is carried out at a temperature of between 60 and 75° C. and a pH of between 4.6 and 5.8, and the treatment with the β-amylase is carried out at a temperature of between 40 and 60° C. and a pH of between 4.6 and 5.8.

It is expedient for the cleaning to be carried out until a point in time at which there is no more change in the streaming potential or the zeta potential of the porous membrane. It has been discovered that the streaming potential occurring at the porous membrane during operation or the zeta potential calculated from it (see below) is a good indication of the extent to which the substances clogging the porous membrane have been removed.

The present invention also aims at increasing the porous membrane's service life by ensuring that it is cleaned at a desirable time. Thus, the present invention provides for the production of beer comprising filtering beer through a porous membrane, which will clog progressively as filtration proceeds. Filtration is halted at a given point when the porous membrane is only partially clogged, i.e., has not yet reached the condition of being totally clogged. The degree of clogging can be determined by any suitable means, desirably by monitoring the pressure drop across the porous membrane such as is generally described in U.S. Pat. No. 5,449,465. Alternatively, the present invention provides for an identification of the time for cleaning by determination of the streaming potential through the filter and/or zeta potential of the filter.

This aspect of the present invention is founded on the recognition that streaming potential—or zeta potential extrapolated from the former's recorded data—will change in a pH range (within which beer brewing or filtering occurs) according to the degree of clogging and thus represents a reliable, and almost quantitative, indicator of the state of clogging. Determination of the streaming potential and/or zeta potential of the porous membrane can hence give an accurate picture of a particular state of clogging.

Porous membranes are known to act in a two-fold way. First, a porous membrane acts as a sieve, when particles larger then the filter's pores are mechanically filtered out of the medium. Secondarily, a porous membrane also is known to act by electrostatic attraction. Particles of a diameter much smaller than the pore size of the membrane are deposited thereon when the zeta potential of the filter medium and that of the particles are of opposite polarity (see, e.g., Informational Brochure SD 872h G of Pall Filtrationstechnik GmbH, Germany).

Yet, not known prior to the present invention is the fact that zeta potential can be used to determine a porous membrane's degree of clogging.

A porous membrane's zeta potential will be affected by its chemical properties. One of ordinary skill in the art will have no difficulty—being cognizant of the present invention—to select only filters whose zeta potential will change at a great enough rate relative to the degree of clogging. With the filter on-line, and by way of continuous monitoring through data acquisition, the filtration process can be halted at an appropriate time, e.g., once clogging sets in.

The cleaning of a filter not yet fully clogged is much easier, while assuring longer service life, than the cleaning of a totally clogged filter. Thus, a preferred method of the present invention has filtration halted at a point when the filter's zeta potential has decreased to a maximum of 20% of the value it exhibited in its unused state, or when clogging does not exceed 80%.

Another refinement of the process will use a porous membrane of polyamide, with filtration halted when the zeta potential exceeds −5 mV as measured at a pH of 4.2.

The beer preferably will undergo pre-filtration before filtration proper, i.e., filtration through the porous membrane. Diatomateous (or infusorial) earth, also known as diatomite, is almost exclusively used for pre-filtration. A combination of diatomateous earth and deep-bed filtration also is feasible.

The present invention can be used in any suitable beer production system. Preferably, the present invention is used in connection with the cluster filter system as described in U.S. Pat. Nos. 5,417,101 and 5,594,161.

The present invention also relates to a filtration unit for filtering beer, with a feeder line for the filtration-bound beer, a porous membrane, and a run-off line for the filtered beer. It is characterized by a module in the form of a meter cell, functioning as bypass, and featuring a porous membrane and means, e.g., electrodes, for monitoring the streaming potential and/or zeta potential of the meter cell's membrane filter through which beer flows.

The present invention also deals with a filtration unit for filtering beer, with the unit featuring a feeder line for filtration-bound beer, a porous membrane, and a run-off line for filtered beer. In divergence from the foregoing paragraph, the filtration unit is characterized by means, e.g., electrodes, being attached to the porous membrane for monitoring or reading the streaming potential and/or zeta potential as the beer flows through the porous membrane. In this variation, the zeta potential is not measured via the meter cell assigned as bypass to the membrane filter, but rather on the membrane filter itself.

Any suitable bypass configuration can be utilized in connection with the embodiments of the present invention. Preferably, the present invention incorporates the apparatus and method described in U.S. Pat. No. 5,449,465.

The discovery that the filter's zeta potential correlates to the general state of clogging can be implemented in beer filtration as follows:

1. Through constant observation of changes taking place in the streaming potential and/or zeta potential of the porous membrane during the filtration process, the membrane's degree of clogging can be pinpointed in order to prevent an unexpected or random occurrence, while timely measures for an exchange of filters can be taken.

2. Filtration can be halted before the porous membrane becomes totally clogged. This promotes easier cleaning of the filter. It has been shown that the clogging substances in a totally clogged filter can only be removed with the greatest of difficulty by conventional methods of cleansing, or cannot be removed from the filter at all, resulting in abbreviated service life.

Once filtration is halted prior to total clogging, the process of cleaning is much easier and more thorough, with the filter retaining an extended life. In the instance of a polyamide porous membrane, it has been discovered that the successful removal of all clogging substances from the porous membrane can be accomplished when filtration is halted at a point where the zeta potential has not lost more than about 80% of its original value, i.e., is not clogged in excess of 80%.

3. The cleaning method's success can be tested by determining the cleaned membrane's zeta potential. The act of cleaning will return the zeta potential to approximately its original value.

By this procedure, the cleaning process can be evaluated and/or optimized for it's efficiency:

4. The aging of a porous membrane for reasons of repeated use can be tracked, providing a handy estimate as to its remaining service life expectancy.

5. By measuring zeta potential, filter material and shunting materials (e.g., diatomite, bentonite, perlite, polyvinyl pyrrolidone) can be tested for suitability in beer filtration by assessing the interaction between clogging substances of liquid systems and filter material and/or shunting means for filters.

6. The service life of a porous membrane can be estimated by way of measuring zeta potential, whereunder a specific membrane load (hl/m$^2$) is recorded up to the point when clogging sets in.

The artisan is aware that most suitable for the process are porous membranes with a zeta potential exhibiting pronounced change in relation to the degree of clogging. Verification of these parameters is easy enough by employing the aforementioned simple test method.

The following examples further illustrate the present invention but, of course, should not be construed as in any way limiting its scope.

Example 1

This example illustrates the effectiveness of the present inventive method to produce beer. In particular, this example demonstrates that cellulases and amylases can be used to satisfactorily clean a porous membrane clogged in the course of beer filtration such that the porous membrane can be reused in continued beer filtration.

A porous membrane made of nylon-6,6 (NB type, commercially available from Pall Filtrationstechnik GmbH, Germany) was used as a filter. Such a filter is frequently used in the state of the art for the cold-filtration of beer.

The so-called membrane filter test according to Esser (Monatszeitschrift für Brauerei (Monthly Magazine for Breweries) 25$^{th}$ year, No. 6, pages 145–151, 1972) was used to determine the filtering performance of the filter. This test is reliable for checking measures for improving filterability.

To determine the filtering efficiency of a new, i.e., unused, porous membrane, a pressure filtration apparatus (SM 16526 type, 200 ml capacity; commercially available from Sartorius GmbH, Goettingen, Germany) was used for a polyamide nylon-6,6 porous membrane having a 47 mm diameter and a 0.2 μm pore size.

Beer cooled down to 0° C. was forced through the porous membrane under isobaric conditions (1 bar), and the amount of filtrate was weighed every 10 seconds. The test was stopped after 200 g of filtrate were obtained. The result is shown as a graph in the diagram of FIG. 1. FIG. 1 shows that, under the conditions indicated above, the 200 g of filtrate were obtained with the unused filter after approximately 210 seconds.

Under identical conditions, the filtering performance of a partially clogged, i.e., used, porous membrane was tested. The result is given in FIG. 2 which shows that even in 720 seconds only approximately 60 g of filtrate were obtained.

The clogged porous membrane was cleaned in accordance with a prior art method, wherein the membrane was first cleaned enzymatically and then chemically, as described below.

For enzymatic cleaning, the clogged membrane was treated for 1 hour with a 1% aqueous solution of a mixture of β-glucanases and xylanases (P3-Ultrasil 65; commercially available from Henkel) with a pH of 5 (adjusted with a 0.05% aqueous solution of a mixture of surfactants and an acidic component (P3-Ultrasil 75; commercially available from Henkel)) at a temperature of 50° C. This treatment was subsequently carried out one more time.

The membrane was then treated for 3 hours with a 0.5% aqueous solution of a mixture of surfactants, glucanases, and proteases (P3-Ultrasil 62; manufacturer: Henkel) with a pH of 9–9.5 (adjusted with a 0.15% aqueous solution of a mixture of surfactants and an alkaline component (P3-Ultrasil 91; manufacturer: Henkel)) at a temperature of 50° C. and subsequently rinsed with warm water (50° C.).

For chemical cleaning, the membrane thereafter was treated for 30 minutes with a 1% aqueous solution of a mixture of surfactants and an acidic component (P3-Ultrasil 75; commercially available from Henkel) at 60° C., and then rinsed with fresh water. The membrane was subsequently treated for 30 minutes with an aqueous solution containing 1% of a mixture of surfactants and an alkaline component (P3-Ultrasil 91; commercially available from Henkel) and 1% of a mixture of surfactants and an oxygen donor (P3-Ultrasil 05; commercially available from Henkel) at a temperature of 60° C. and then rinsed with fresh water. The membrane was then treated once more for 30 minutes with a 0.5% aqueous solution of a mixture of surfactants and an acidic component (P3-Ultrasil 75; commercially available from Henkel) and subsequently rinsed with fresh water until the rinse water reached the electrical conductivity of fresh water.

Figure 3:
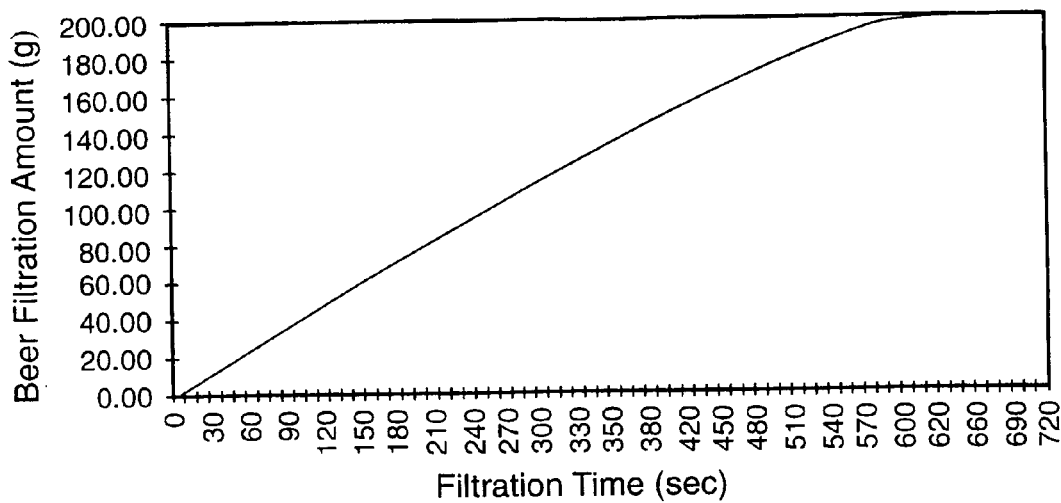
FIG. 3 is a graph of beer filtration amount (g) versus filtration time (sec) in connection with filtering beer through a previously clogged porous membrane cleaned in accordance with a prior art technique.

The filtering performance of this cleaned porous membrane was then tested again under the conditions indicated above. The result is shown in FIG. 3. FIG. 3 shows that the filtering performance has improved somewhat as the 200 g of filtrate were obtained after approximately 600 seconds.

Figure 2:
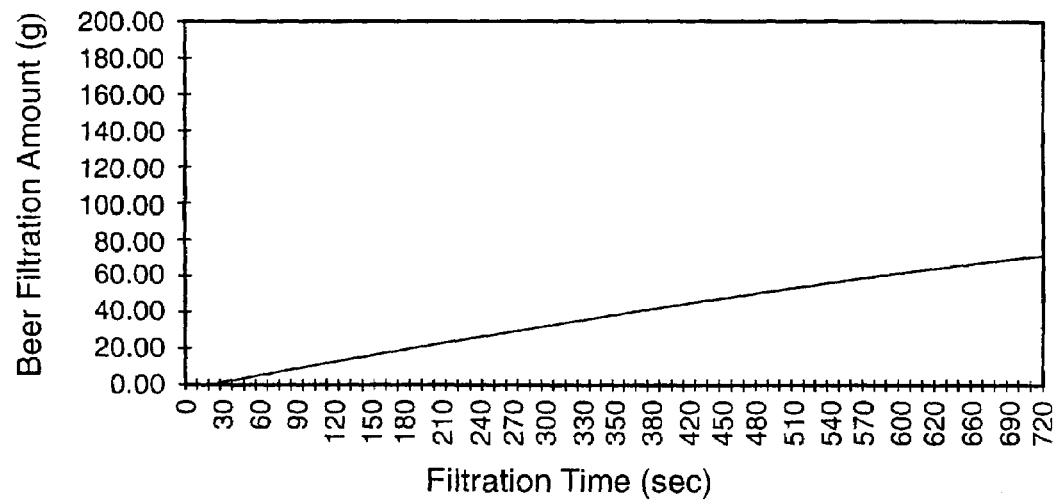
FIG. 2 is a graph of beer filtration amount (g) versus filtration time (sec) in connection with filtering beer through a clogged porous membrane.

A similarly clogged membrane whose filtering efficiency is shown in FIG. 2 was cleaned in accordance with the method according to the present invention. The membrane was treated for 30 minutes with an aqueous solution of $C_1$- and $C_x$-cellulases, the solution having a pH value of 4.7, at a temperature of 45° C. The membrane was then treated with the same solution, but at a pH value of 5.0 and a temperature of 50° C., and, finally, at a pH value of 4.7 and a temperature of 60° C. for 60 minutes.

The membrane was subsequently rinsed with warm water at 50° C. The filtering performance of the membrane cleaned in accordance with the present invention was tested in accordance with the above procedure. The result is shown in FIG. 4.

Figure 4:
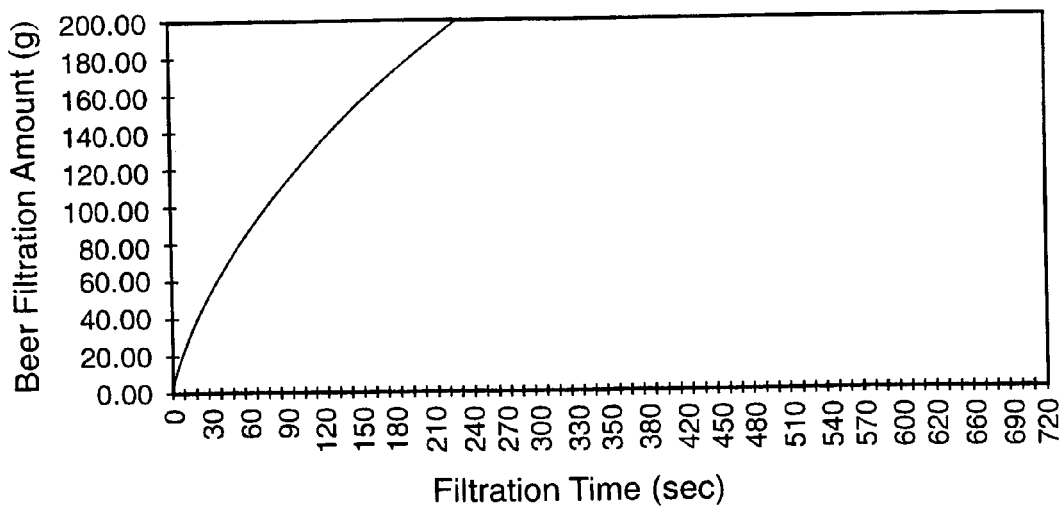
FIG. 4 is a graph of beer filtration amount (g) versus filtration time (sec) in connection with filtering beer through a previously clogged porous membrane cleaned in accordance with the present invention.

FIG. 4 shows that 200 g of filtrate were obtained after approximately 220 seconds. This represents a significant improvement over the prior art (FIG. 3). The method according to the present invention, therefore, allows considerably better cleaning of a used membrane filter than is possible with prior art cleaning methods.

Equally good results were obtained when, in accordance with the present invention, an amylase was used instead of a cellulose. The service life of a porous membrane thus can be increased with the cleaning method according to the present invention.

Example 2

This example illustrates the use of the streaming or zeta potential of a porous membrane to assist in the cleaning of the porous membrane. In particular, the streaming or zeta potential is demonstrated to be useful in determining the extent of membrane cleaning as well as when a membrane is most satisfactorily cleaned.

The zeta potential of membrane filters was determined with the electrokinetic measuring system EKA of Anton Paar GmbH, Austria. This measurement is based on the streaming potential method. An electrolyte flows through the filters, and the potential (streaming potential) which is produced by shearing-off of counterions is detected with electrodes, and the zeta potential is calculated from this measured quantity (see below).

Figure 5:
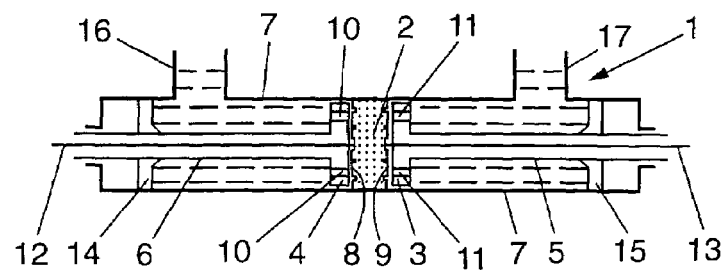
FIG. 5 is a schematic diagram depicting a device for measuring the zeta potential of a filtration medium.

FIG. 5 shows diagrammatically the measuring cell with which the streaming potential or the zeta potential was determined. Reference numeral 1 designates the measuring cell in which the porous membrane 2 is clamped without warping in filter holders 3 and 4 made of polytetrafluoroethylene. The filter holders 3 and 4 are the end pieces of two pistons 5 and 6, respectively, which are mounted for displacement in the cylindrical part 7 of the measuring cell 1.

The end pieces 3 and 4 of the pistons 5 and 6, respectively, have fine bores 10 and 11 for the fluid which is to be filtered and press the perforated electrodes 8 and 9 against the porous membrane 2. The electrodes 8 and 9 are connected to the two electric terminals 12 and 13 extending inside the pistons 5 and 6 so the streaming potential built up as fluid flows through the membrane 2 can be measured. Silver electrodes or silver chloride electrodes which exhibit a low polarization during passage of current are preferred for the electrodes. The pistons 6 and 7 are mounted in the seals 14 and 15, respectively, such that, on the one hand, they are displaceable, and, on the other hand, they do not allow any fluid to leak from the measuring cell.

The fluid to be filtered flows through the supply line 16 into the cylindrical part 7 of the measuring cell 1, through the fine bores 10 of the piston 6, through the electrode 8, with an electric potential being built up, and through the porous membrane 2. The filtered fluid flows through the electrode 9, with a potential likewise being built up, passes through the fine bores 11 of the piston and leaves the measuring cell through the discharge line 17.

To determine the zeta potential from the measured streaming potential, measurement (not illustrated) of the differential pressure in the measuring cell between supply line 16 and discharge line 17, the conductivity and also the pH value is necessary. The zeta potential is calculated from these measured quantities as follows:

$$\text{zeta potenital} = \frac{U}{\Delta p} \cdot \frac{LF \cdot \eta}{\varepsilon \cdot \varepsilon^0}$$

where U is the streaming potential, Δp the pressure difference, LF the conductivity, η the viscosity, and ϵϵ the dielectric constant.

Figure 6:
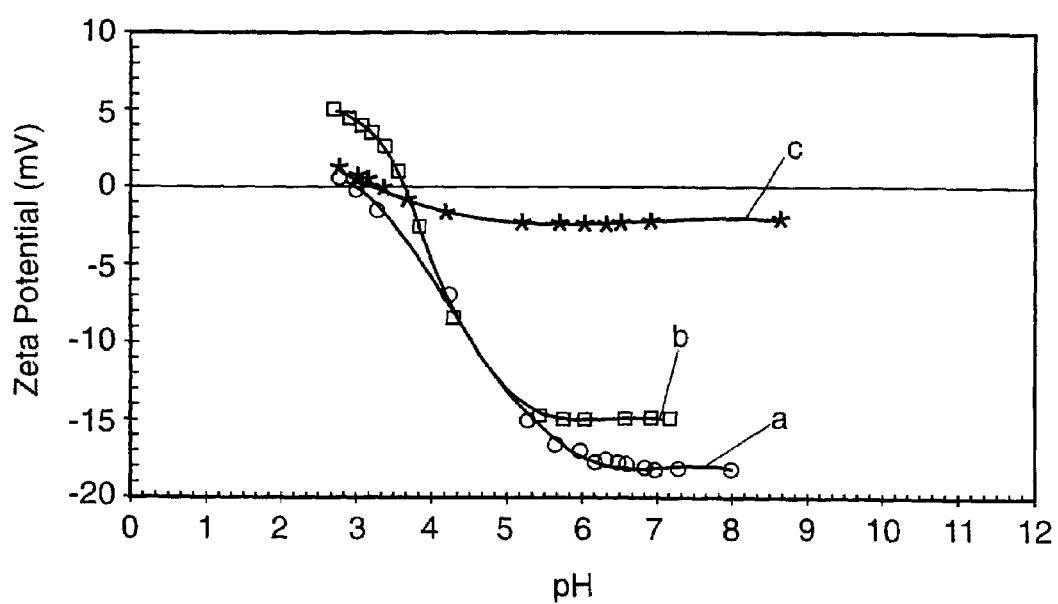
FIG. 6 is a graph of filtration medium zeta potential (mV) versus electrolyte solution pH, wherein curve "a" is for a new porous membrane, curve "b" is for a porous membrane that has been partially clogged in connection with filtering beer, and curve "c" is for a porous membrane that has been nearly fully clogged in connection with filtering beer.

The change in the zeta potential of the membrane filter as clogging progresses is shown in FIG. 6. This figure is a diagram in which the zeta potential in millivolts is plotted as ordinate, and the pH value at which the zeta potential was determined as abscissa. The pH value of the electrolyte solution (0.001 N aqueous KCl solution) was set with 0.1 N HCl or with 0.1 N NaOH. The specified pressure difference was 350 mbar.

The diagram was obtained by first determining with the measuring cell described above the zeta potentials of a new, i.e., unused porous membrane made of polyamide (NB type, commercially available from Pall Filtrationstechnik GmbH, 6072 Dreieich 1, Germany) at various pH values.

The results relating to the unused porous membrane are plotted as curve "a". It is evident that the unused porous membrane has a zeta potential of approximately −18 mV with an alkaline pH, and that the zeta potential increases with decreasing pH and finally reaches zero value at a pH of approximately 3.

Curve "b" shows the dependence of the zeta potential on the pH value of the porous membrane under identical measuring conditions, as stated above, but after use thereof for filtering beer and, therefore, with partial clogging. As is apparent, the zeta potential is raised somewhat by the partial clogging and only reaches a value of approximately −15 mV at pH values of approximately 7.

Curve "c" was plotted for the same porous membrane in the nearly fully clogged state. It is evident that the zeta potential now changes only slightly with the pH value, and even in the alkaline range does not fall below approximately −2 mV.

To test the cleaning according to the present invention, the zeta potential of the membrane to be cleaned is determined, and the cleaning was successful if the zeta potential of the cleaned membrane shifted as far as possible in the direction of the zeta potential of the unused membrane.

It will be clear to one skilled in the art that porous membranes whose zeta potential changes to a sufficiently great extent as a function of the degree of clogging are particularly well-suited for use in the method according to the present invention. This characteristic can be easily determined by one skilled in the art by simple testing.

A porous membrane of polyamide is especially suitable in the context of the process since the zeta potential at the pH of the filtration-bound beer (ca. pH=4.2) will undergo severe change with progressive clogging. As can be learned from FIG. 6, the membrane at this particular pH value at the beginning of filtration shows a zeta potential of approximately −8 mV. The totally clogged membrane has a zeta potential of approximately −2 mV.

Figure 7:
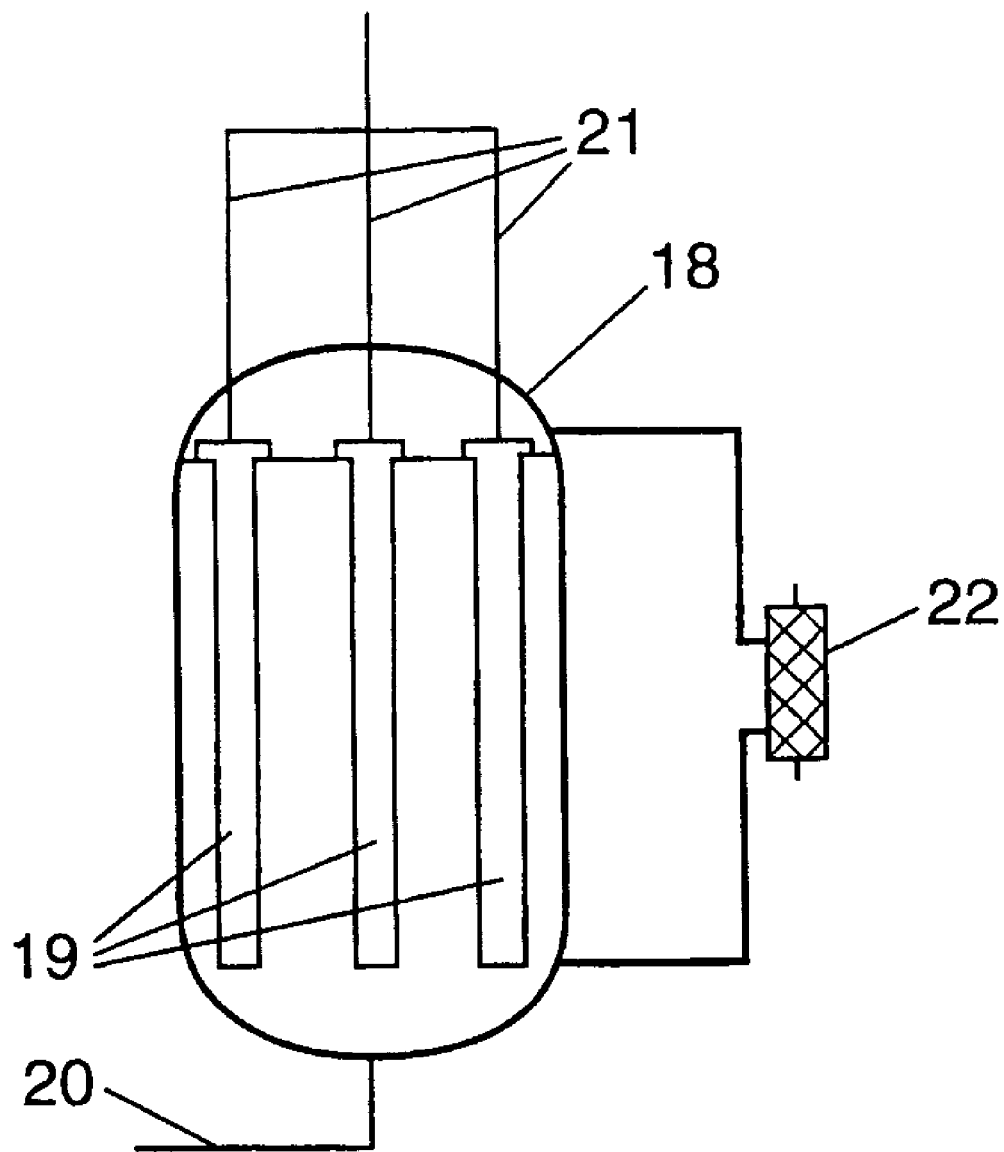
FIG. 7 is a schematic diagram depicting an apparatus for filtering beer using a bypass system and the measuring device of FIG. 5.

FIG. 7 shows a variation of the discussed filtration unit featuring a filtration chamber 18, with a meter cell 22 assigned to it as a bypass, as depicted in FIG. 5. The filtration chamber 18 holds filter candles 19.

The filtration-bound beer is fed via line 20 into the filtration chamber 18, flowing through the filter candles (membrane filter) 19, and exits the filter chamber 18 through run-off line 21 in the form of filtered beer.

The meter cell is shown in FIG. 7 without detail. The actual flow through the meter cell 22 must be controlled to the extent that an amount of beer is filtered per cm$^2$ of the porous membrane's surface which is equal to the amount of porous membrane surface per cm$^2$ in the filtration chamber 18.

The severe change in zeta potential of the filter membrane 2 (FIG. 5) inside meter cell 1 during filtration allows an assessment of the state of the filter candles 19 in filtration chamber 18.

Example 3

This example illustrates the effectiveness of cellulase derived from *Aspergillus niger* in enzymatically degrading soluble and crystalline cellulose substrates.

Cellulase derived from *Aspergillus niger* was obtained from Fluka (item numbers 22178). The enzyme was evaluated with respect to two different celluloses: soluble carboxymethylcellulose (CMC, available from Aldrich as item number 41927-3) and crystalline cellulose (Avicel, available from FMC as item number PH-105).

The test methodology involved the preparation of an incubation solution of (i) 18 ml CMC (1%) or Avicel (1%), (ii) 5 ml sodium acetate buffer (50 mM, pH 4.8), and (iii) 5 ml of a solution of the enzyme in sodium acetate buffer (50 mM, pH 4.8) at 30° C. A test solution then was prepared by mixing 1.4 ml of the incubation solution with 0.1 ml glucose solution (0.15%) and 1.5 ml 3,5-dinitrosalicylic acid (DNS) reagent (available from Sigma as item number D-0550). The test solution was boiled for 15 minutes. The total μmol glucose equivalents/mg enzyme as a function of time (min) was determined spectroscopically (575 nm), using two parallel samples, in accordance with the procedure described in Miller, *Anal. Chem.*, 31, 426–28 (1959), using a straight calibration with a glucose standard. Protein amounts were determined in accordance with the procedure described in Bradford, *Anal. Biochem.*, 72, 248–64 (1976), using a bovine serum albumin (BSA) standard.

The enzymatic degradation of cellulose results in the production of glucose, and, therefore, the measurement of μmol glucose equivalents/mg enzyme is a measure of the activity of the enzyme with respect to a particular type of cellulose, e.g., soluble (CMC) or crystalline (Avicel) cellulose.

The results of this evaluation with respect to the cellulase derived from *Aspergillus niger* are set forth in Table 1. The test solution with the soluble (CMC) cellulose substrate contained 0.8 mg enzyme/28 ml incubation solution (ca. 17.6 μg protein). The test solution with the crystalline (Avicel) cellulose substrate contained 0.35 mg enzyme/28 ml incubation solution (ca. 7.7 μg protein).

TABLE 1

Cellulase derived from *Aspergillus niger*

Glucose Equivalents (μmol/mg enzyme)

| Time (min) | Soluble Cellulose Substrate | Crystalline Cellulose Substrate | Crystalline: Soluble Cellulose Activity Ratio |
|---|---|---|---|
| 0 | 0 | 0 | — |
| 10 | 27.0 | 0 | 0 |
| 15 | 28.5 | 1.7 | 0.06 |
| 30 | 30.5 | — | — |
| 45 | 34.0 | 1.7 | 0.05 |
| 60 | 34.8 | 4.0 | 0.11 |
| 75 | 37.5 | 3.5 | 0.09 |
| 90 | 37.8 | 3.7 | 0.10 |
| 105 | 38.3 | — | — |
| 120 | 39.5 | 10.3 | 0.26 |

Those enzymes that have a relatively greater activity toward crystalline cellulose substrates as compared to soluble cellulose substrates have been found to be particularly effective in cleaning porous membranes used in beer filtration. The ratio of the glucose equivalents produced with respect to the crystalline cellulose substrate and the glucose equivalents produced with respect to the soluble cellulose substrate thus is an indicator of the effectiveness of the enzyme in the context of the present invention and is described as the crystalline:soluble cellulose activity ratio. Desirably, the crystalline:soluble cellulose activity ratio has the previously described values at a range of times in the test protocol described in this example, e.g., at 30 minutes, 60 minutes, and/or 90 minutes, especially at 60 minutes.

As is apparent from the data set forth in Table 1, the cellulase from *Aspergillus niger* has a crystalline:soluble cellulose activity ratio at 60 minutes of 0.11, indicating that it is a moderately effective enzyme for purposes of cleaning porous membranes used in connection with the filtration of beer.

Example 4

This example illustrates the effectiveness of cellulase derived from *Trichoderma reesei* in enzymatically degrading soluble and crystalline cellulose substrates.

Cellulase derived from *Trichoderma reesei* was obtained from Fluka (item numbers 22173). The enzyme was evaluated in the same manner as recited in Example 3.

The results of this evaluation with respect to the cellulase derived from *Trichoderma reesei* are set forth in Table 2. The test solution with the soluble (CMC) cellulose substrate contained 0.37 mg enzyme/28 ml incubation solution (ca. 128 μg protein). The test solution with the crystalline (Avicel) cellulose substrate contained 0.08 mg enzyme/28 ml incubation solution (ca. 25.6 μg protein).

TABLE 2

Cellulase derived from *Trichoderma reesei*

| | Glucose Equivalents (μmol/mg enzyme) | | |
|---|---|---|---|
| Time (min) | Soluble Cellulose Substrate | Crystalline Cellulose Substrate | Crystalline: Soluble Cellulose Activity Ratio |
| 0 | 0 | 0 | — |
| 5 | 62.6 | 0 | — |
| 10 | 84.7 | 21.5 | 0.25 |
| 15 | 96.3 | 30.0 | 0.31 |
| 30 | 99.5 | 40.0 | 0.40 |
| 45 | 152.0 | 57.5 | 0.38 |
| 60 | 139.0 | 75.0 | 0.54 |
| 75 | 178.4 | 85.0 | 0.48 |
| 90 | 184.2 | 95.0 | 0.52 |
| 105 | 172.6 | 100.0 | 0.58 |
| 120 | 193.7 | 115.0 | 0.59 |

As is apparent from the data set forth in Table 2, the cellulase from *Trichoderma reesei* has a crystalline:soluble cellulose activity ratio at 60 minutes of 0.54, indicating that it is a superior enzyme for purposes of cleaning porous membranes used in connection with the filtration of beer.

Example 5

This example illustrates the effectiveness of cellulase derived from *Bacillus subtilis* in enzymatically degrading soluble and crystalline cellulose substrates.

β-cellulase derived from *Bacillus subtilis* was obtained from Fluka (item numbers 49106). The enzyme was evaluated in the same manner as recited in Example 3.

The results of this evaluation with respect to the β-cellulase derived from *Bacillus subtilis* are set forth in Table 3. The test solution with the soluble (CMC) cellulose substrate contained 14.4 mg enzyme/28 ml incubation solution (ca. 8.3 μg protein). The test solution with the crystalline (Avicel) cellulose substrate contained 15.6 mg enzyme/28 ml incubation solution (ca. 8.8 μg protein).

TABLE 3

β-Cellulase derived from *Bacillus subtilis*

| | Glucose Equivalents (μmol/mg enzyme) | | |
|---|---|---|---|
| Time (min) | Soluble Cellulose Substrate | Crystalline Cellulose Substrate | Crystalline: Soluble Cellulose Activity Ratio |
| 0 | 0 | 0 | — |
| 5 | 1.1 | 0.1 | 0.09 |
| 10 | 1.0 | 0.1 | 0.10 |
| 15 | 0.9 | 0.1 | 0.11 |
| 30 | 0.9 | 0.1 | 0.11 |
| 45 | 1.0 | 0.1 | 0.10 |
| 60 | 1.0 | 0.1 | 0.10 |
| 75 | 1.0 | 0.2 | 0.20 |
| 90 | 1.1 | 0.2 | 0.18 |
| 105 | 1.1 | 0.1 | 0.09 |
| 120 | 1.3 | 0.1 | 0.08 |

As is apparent from the data set forth in Table 3, the β-cellulase from *Bacillus subtilis* has a crystalline:soluble cellulose activity ratio at 60 minutes of 0.10, indicating that it is a moderately effective enzyme for purposes of cleaning porous membranes used in connection with the filtration of beer.

Example 6

This example illustrates the effectiveness of exocellulase derived from *Thermomonospora fusca* in enzymatically degrading soluble and crystalline cellulose substrates.

Exocellulase E3 derived from *Thermomonospora fusca* was obtained from Cornell University. The enzyme was evaluated in the same manner as recited in Example 3 except that the incubation solution comprised (i) 18 ml CMC (1%) or Avicel (1%), (ii) 9 ml sodium acetate buffer (50 mM, pH 5.6), and (iii) 1 ml of a solution of the enzyme in sodium acetate buffer (50 mM, pH 5.6), shaken at 50° C. (ca. 960 μm protein). The test solution was evaluated using a color test rather than the DNS test recited in Example 3.

The results of this evaluation with respect to the exocellulase derived from *Thermomonospora fusca* are set forth in Table 4.

TABLE 4

Exocellulase derived from *Thermomonospora fusca*

| | Glucose Equivalents (μmol/mg enzyme) | | |
|---|---|---|---|
| Time (min) | Soluble Cellulose Substrate | Crystalline Cellulose Substrate | Crystalline: Soluble Cellulose Activity Ratio |
| 0 | 0 | 0 | — |
| 5 | 0.1 | 0 | — |
| 10 | 0.1 | 0.3 | 3.00 |
| 15 | 0.2 | 0.3 | 1.50 |
| 30 | 0.2 | 0.3 | 1.50 |
| 45 | 0.3 | 0.4 | 1.33 |
| 60 | 0.3 | 0.4 | 1.33 |
| 75 | 0.3 | 0.5 | 1.67 |
| 90 | 0.3 | 0.3 | 1.00 |

As is apparent from the data set forth in Table 4, the Exocellulase derived from *Thermomonospora fusca* has a crystalline:soluble cellulose activity ratio at 60 minutes of 1.33, indicating that it is a superior enzyme for purposes of cleaning porous membranes used in connection with the filtration of beer.

Example 7

This example illustrates the effectiveness of α-amylase derived from *Bacillus subtilis* in enzymatically degrading soluble and crystalline cellulose substrates.

α-amylase derived from *Bacillus subtilis* was obtained from Fluka (item numbers 10069). The enzyme was evaluated in the same manner as recited in Example 3 except that the incubation solution comprised (i) 18 ml CMC (1%) or Avicel (1%), (ii) 5 ml sodium acetate buffer (50 mM, pH 6.9), and (iii) 5 ml of a solution of the enzyme in sodium acetate buffer (50 mM, pH 6.9), shaken at 30° C. (ca. 8.5 μm protein). The test solution was evaluated using a color test rather than the DNS test recited in Example 3.

The results of this evaluation with respect to the α-amylase derived from *Bacillus subtilis* are set forth in Table 5.

TABLE 5

α-Amylase derived from *Bacillus subtilis*

Glucose Equivalents (μmol/mg enzyme)

| Time (min) | Soluble Cellulose Substrate | Crystalline Cellulose Substrate | Crystalline: Soluble Cellulose Activity Ratio |
|---|---|---|---|
| 0 | 0 | 0 | — |
| 5 | 0.1 | 0 | 0 |
| 10 | 0.1 | 0 | 0 |
| 15 | 0.1 | 0 | 0 |
| 30 | 0.1 | 0 | 0 |
| 45 | 0.1 | 0 | 0 |
| 60 | 0.1 | 0 | 0 |
| 75 | 0.1 | 0 | 0 |
| 90 | — | 0 | — |

As is apparent from the data set forth in Table 5, the α-amylase from *Bacillus subtilis* has a crystalline:soluble cellulose activity ratio at 60 minutes of about 0 (<0.1 μmol detection limit), indicating that it is not as effective an enzyme for purposes of cleaning porous membranes used in connection with the filtration of beer as the previously described cellulases.

Example 8

This example illustrates the effectiveness of various cellulases in enzymatically degrading soluble and crystalline cellulose substrates.

Cellulase preparations were obtained from the Erbsloh Company: (a) $C_x$-cellulase (powder, item number VP 0945/2), (b) $C_1$-cellulase from *Trichoderma reesei* (powder, item number VP 0965/2), (c) $C_1$-cellulase (liquid, item number Cleanzym SB1), (d) $C_1$-cellulase (liquid, item number VP 0976/4), (e) cellulase (liquid, item number VP 0971/1), and (f) cellulase (liquid, item number VP 0971/4). The enzymes were evaluated in a manner similar to that recited in Example 3 except that the incubation solutions comprised (i) 23 ml CMC (1%) or Avicel (1%) in a sodium acetate buffer (50 mM, pH 4.8), and (ii) 5 ml of a solution of the enzyme in sodium acetate buffer (50 mM, pH 4.8). 0.5% stock solutions were prepared from the powdered enzyme preparations (5 mg/ml) and liquid enzyme preparations (5 μl/ml). The solutions were shaken at 30° C. The test solution was evaluated after making a 1:5 dilution using a color test rather than the DNS test recited in Example 3.

The results of this evaluation with respect to the various cellulases are set forth in Table 6. The glucose equivalents data is in terms of average μmol glucose equivalents/min (for the total time interval) and are not normalized per mg enzyme (as was the situation with the data recited in Tables 1–5). The crystalline:soluble cellulose activity ratio, of course, is not altered by the units for the glucose equivalents inasmuch as the units divide out in calculating the ratio (i.e., the ratio is unit-less).

TABLE 6

Cellulase Preparations

Glucose Equivalents (μmol/min)

| Time (min) | Preparation (a) | | | Preparation (b) | | | Preparation (c) | | |
|---|---|---|---|---|---|---|---|---|---|
| | Soluble Cellulose Substrate | Crystalline Cellulose Substrate | Crystalline: Soluble Cellulose Activity Ratio | Soluble Cellulose Substrate | Crystalline Cellulose Substrate | Crystalline: Soluble Cellulose Activity Ratio | Soluble Cellulose Substrate | Crystalline Cellulose Substrate | Crystalline: Soluble Cellulose Activity Ratio |
| 0 | 0 | 0 | — | 0 | 0 | — | 0 | 0 | — |
| 5 | 0.12 | 0 | 0 | 0.14 | 0.11 | 0.79 | 0.09 | 0.05 | 0.56 |
| 10 | 0.06 | 0.01 | 0.17 | 0.11 | 0.08 | 0.73 | 0.09 | 0.06 | 0.67 |
| 15 | 0.06 | 0.01 | 0.17 | 0.08 | 0.09 | 1.13 | 0.08 | 0.04 | 0.50 |
| 30 | 0.02 | 0.02 | 1.00 | 0.07 | 0.05 | 0.71 | 0.07 | 0.03 | 0.43 |
| 45 | 0.04 | 0.02 | 0.50 | 0.06 | 0.04 | 0.67 | 0.03 | 0.02 | 0.67 |
| 60 | 0.03 | 0.02 | 0.67 | 0.04 | 0.03 | 0.75 | 0.05 | 0.02 | 0.40 |
| 75 | 0.03 | 0.02 | 0.67 | 0.04 | 0.03 | 0.75 | 0.04 | | — |
| 90 | 0.02 | 0.01 | 0.50 | 0.03 | 0.03 | 1.00 | 0.03 | 0.2 | 0.67 |

TABLE 6-continued

Cellulase Preparations

Glucose Equivalents (μmol/min)

| | Preparation (d) | | | Preparation (e) | | | Preparation (f) | | |
|---|---|---|---|---|---|---|---|---|---|
| Time (min) | Soluble Cellulose Substrate | Crystalline Cellulose Substrate | Crystalline: Soluble Cellulose Activity Ratio | Soluble Cellulose Substrate | Crystalline Cellulose Substrate | Crystalline: Soluble Cellulose Activity Ratio | Soluble Cellulose Substrate | Crystalline Cellulose Substrate | Crystalline: Soluble Cellulose Activity Ratio |
| 0 | 0 | 0 | — | 0 | 0 | — | 0 | 0 | — |
| 5 | 0.01 | 0.23 | 23.0 | 0.15 | 0.13 | 0.87 | 0.07 | 0.04 | 0.57 |
| 10 | 0.19 | 0.14 | 0.74 | 0.10 | 0.09 | 0.90 | 0.06 | 0.03 | 0.50 |
| 15 | 0.15 | 0.12 | 0.80 | 0.06 | 0.05 | 0.83 | 0.04 | 0.02 | 0.50 |
| 30 | 0.10 | 0.09 | 0.90 | 0.05 | 0.03 | 0.60 | 0.03 | 0.01 | 0.33 |
| 45 | 0.07 | 0.07 | 1.00 | 0.04 | 0.03 | 0.75 | 0.02 | 0.01 | 0.50 |
| 60 | 0.06 | 0.06 | 1.00 | 0.03 | 0.02 | 0.67 | 0.02 | 0.01 | 0.50 |
| 75 | 0.05 | 0.06 | 1.20 | 0.03 | 0.02 | 0.67 | 0.02 | 0.01 | 0.50 |
| 90 | 0.04 | 0.06 | 1.50 | 0.03 | 0.02 | 0.67 | 0.01 | 0.01 | 1.00 |

As is apparent from the data set forth in Table 6, the various cellulases have crystalline:soluble cellulose activity ratios at 60 minutes ranging from 0.4–1.0, indicating that they are superior enzymes for the purpose of cleaning porous membranes used in connection with the filtration of beer.

Example 9

This example further illustrates the effectiveness of the present inventive method to produce beer. In particular, this example demonstrates that cellulases alone (i.e., without the use of other enzymes) are superior in the cleaning of porous membranes clogged in the course of beer filtration for the purpose of returning the porous membrane to use in continued beer filtration.

Beer of different characteristics was filtered through nylon-6,6 porous membranes (ca. 300 m²) with a pore rating of 0.45 μm in a cluster filter arrangement (PALL-CFS, available from Pall Filtrationstechnik GmbH, Germany). At certain beer filtration intervals, the porous membranes were subjected to a cleaning process in accordance with the present invention.

The cleaning process involved circulation of a 0.5% NaOH solution for 15 minutes, followed by a 60 minute soak. The porous membranes then were backflushed with water. An internal loop was established through the cluster filter arrangement with water at 38° C. Lactic acid was added to the water to adjust the pH to 4.2±0.3, and then 6 l of an enzyme preparation containing a cellulase derived from *Trichoderma longibrachiatum* obtained from the Erbsloh Company (item number VP 0945/1) was added to the water via a dosing pump. The enzyme preparation in the water (at a concentration of about 20–40 g enzyme/100 kg filter housing fluid volume) was circulated for about 15 minutes, followed by a 30 minute soak, another 15 minute circulation, and finally a 6 hour soak. The porous membranes then were backflushed with water.

The porous membranes were cleaned after about 90,000 hl total beer was filtered through the porous membranes, and then the porous membranes were returned to service, i.e., to continue filtering beer. The porous membranes similarly were cleaned and returned to service after about 100,000 hl, about 140,000 hl, and about 165,000 hl total beer was filtered through the porous membranes. The porous membranes mechanically failed after about 190,000 hl total beer was filtered through the porous membranes.

The foregoing data demonstrates that beer can be satisfactorily produced using the present invention. Specifically, the results of this example demonstrate that a porous membrane can be effectively cleaned and returned to service in accordance with the present invention, thereby prolonging the useful life of the porous medium in a beer production process.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A method for producing beer comprising:
   (a) filtering beer through a porous membrane until such time that the porous membrane is in need of cleaning,
   (b) contacting the porous membrane with an enzyme selected from the group consisting of cellulases, amylases, and combinations thereof in the absence of any other enzymes to clean the porous membrane, and
   (c) then reusing the porous membrane to continue filtering beer.

2. The method of claim 1, wherein the porous membrane is contacted with the cellulase and no other enzyme.

3. A method for producing beer comprising:
   (a) filtering beer through a porous membrane until such time that said porous membrane is in need of cleaning,
   (b) contacting the porous membrane with a cellulase, in absence of any other enzymes, the cellulase having a crystalline:soluble cellulase activity ratio at 60 minutes of at least about 0.1 to clean the porous membrane, and
   (c) then reusing the porous membrane to continue filtering beer.

4. The method of claim 3, wherein the cellulase has a crystalline:soluble cellulose activity ratio at 60 minutes of at least about 0.3.

5. The method of claim 4, wherein the cellulase has a crystalline:soluble cellulose activity ratio at 60 minutes of at least about 0.4.

6. The method of claim 5, wherein the cellulase has a crystalline:soluble cellulose activity ratio at 60 minutes of at least about 0.5.

7. The method of claim 6, wherein the cellulase has a crystalline:soluble cellulose activity ratio at 60 minutes of at least about 1.

8. The method of claim 7, wherein the cellulase has a crystalline:soluble cellulose activity ratio at 60 minutes of at least about 1.2.

9. The method of claim 3, wherein the cellulase is derived from *Trichoderma*.

10. The method of claim 9, wherein the *Trichoderma* is *Trichoderma reesei* or *Trichoderma longibrachiatum*.

11. The method of claim 3, wherein the cellulase is derived from *Thermomonospora*.

12. The method of claim 11, wherein the *Thermomonospora* is *Thermomonospora fusca*.

13. The method of claim 1, wherein the porous membrane is contacted with an amylase.

14. The method of claim 13, wherein the amylase is selected from the group consisting of α-amylase, β-amylase, and the combination thereof.

15. The method of claim 3, wherein the method further comprises contacting the porous membrane with an aqueous base prior to reusing the porous membrane.

16. The method of claim 15, wherein the aqueous base is an aqueous solution of NaOH and/or KOH.

17. The method of claim 15, wherein the base is present in a concentration of 0.1–1 N in the aqueous base.

18. The method of claim 15, wherein the porous membrane is contacted with the aqueous base at a temperature of 40–90° C.

19. The method of claim 1, wherein the porous membrane is contacted with α-amylase at a temperature of 60–75° C. and a pH of 4.6–5.8.

20. The method of claim 1, wherein the porous membrane is contacted with β-amylase at a temperature of 40–60° C. and a pH of 4.6–5.8.

21. The method of claim 3, wherein the porous membrane is cleaned until the zeta potential of the porous membrane ceases to change.

22. The method of claim 3, wherein the time that the porous membrane is in need of cleaning is determined by the pressure drop across the porous membrane.

23. The method of claim 3, wherein the method further comprises determining the time that the porous membrane is in need of cleaning by determining the streaming potential or zeta potential of the porous membrane.

24. The method of claim 23, wherein the filtration is halted when the streaming potential or zeta potential of the porous membrane is reduced to 20% of its original value for the unused porous membrane.

25. The method of claim 3, wherein the porous membrane is a polyamide porous membrane.

26. The method of claim 25, wherein the filtration is halted when the zeta potential of the porous membrane exceeds −5 mV as measured at pH 4.2.

27. The method of claim 3, wherein the filtering of the beer is cold-filtering of the beer.

28. The method of claim 1, wherein contacting the porous membrane with an enzyme comprises contacting the porous membrane with a cellulase having a crystalline:soluble cellulase activity ratio at 60 minutes of at least about 0.1 to clean the porous membrane.

29. The method of claim 3, wherein the porous membrane is a nylon-6,6 membrane.

30. The method of claim 3, wherein the porous membrane has a pore rating of about 0.02–1 μm.

31. The method of claim 30, wherein the porous membrane has a pore rating of about 0.1–1 μm.

32. The method of claim 31 wherein the porous membrane has a pore rating of about 0.45 μm.

33. The method of claim 3, wherein the method further comprises pre-filtering the beer before filtering the beer through the porous membrane.

34. The method of claim 33, wherein the beer is pre-filtered through Diatomateous earth or a combination of Diatomateous earth and deep-bed filtration.

* * * * *